(12) United States Patent
Drott et al.

(10) Patent No.: US 8,226,175 B2
(45) Date of Patent: Jul. 24, 2012

(54) BRAKE SYSTEM OF THE BRAKE-BY-WIRE TYPE

(75) Inventors: Peter Drott, Frankfurt/Main (DE);
Holger von Hayn, Bad Vilbel (DE);
Thomas Sellinger, Offenbach (DE);
Horst Kraemer, Ginsheim-Gustavsburg (DE)

(73) Assignee: Continental Teves AG & Co. oHG (DE)

( * ) Notice: Subject to any disclaimer, the term of this patent is extended or adjusted under 35 U.S.C. 154(b) by 252 days.

(21) Appl. No.: 12/671,251

(22) PCT Filed: Jul. 17, 2008

(86) PCT No.: PCT/EP2008/059362
§ 371 (c)(1),
(2), (4) Date: Feb. 4, 2010

(87) PCT Pub. No.: WO2009/016040
PCT Pub. Date: Feb. 5, 2009

(65) Prior Publication Data
US 2010/0200342 A1    Aug. 12, 2010

(30) Foreign Application Priority Data
Aug. 2, 2007   (DE) .......................... 10 2007 036 426

(51) Int. Cl.
*B60T 8/32* (2006.01)
(52) U.S. Cl. .................................................... 303/114.3
(58) Field of Classification Search .......... 188/156–164, 188/356–360; 303/114.1, 114.3; 60/547.1–582
See application file for complete search history.

(56) References Cited

U.S. PATENT DOCUMENTS

| | | | | | |
|---|---|---|---|---|---|
| 3,065,604 | A | * | 11/1962 | Randol et al. | 60/570 |
| 4,088,375 | A | * | 5/1978 | DePas, Sr. | 303/180 |
| 4,659,153 | A | * | 4/1987 | Klein | 303/114.3 |
| 2006/0163941 | A1 | * | 7/2006 | Von Hayn et al. | 303/155 |
| 2008/0196983 | A1 | * | 8/2008 | Von Hayn et al. | 188/156 |
| 2008/0217122 | A1 | * | 9/2008 | Von Hayn et al. | 188/159 |

FOREIGN PATENT DOCUMENTS

| | | |
|---|---|---|
| DE | 198 36 691 A1 | 3/2000 |
| DE | 10 2004 011 622 A1 | 3/2005 |
| DE | 10 2007 016 975 A1 | 10/2008 |
| EP | 1 557 333 A1 | 7/2005 |
| WO | WO 2005/014351 A1 | 2/2005 |

* cited by examiner

*Primary Examiner* — Christopher Schwartz
(74) *Attorney, Agent, or Firm* — RatnerPrestia

(57) ABSTRACT

A brake system of the brake-by-wire (BBW) type for a vehicle having a brake pressure signal generator which can be activated by a brake pedal and can be connected to wheel brakes outside the BBW operating mode, having a pressure source which can be actuated by an electronic control unit and can be connected to the brakes of the vehicle in the BBW operating mode, having provisions for sensing a driver's deceleration request and having a pedal travel simulator which interacts with the brake pedal. A restoring force acting on the brake pedal can be simulated in the BBW operating mode independently of the actuating of the pressure source, and having a device which can be actuated by the electronic control unit and which permits activation of the pedal travel simulator in the BBW operating mode and deactivation of the pedal travel simulator outside the BBW operating mode.

12 Claims, 3 Drawing Sheets

BRAKE SYSTEM OF THE BRAKE-BY-WIRE TYPE

CROSS REFERENCE TO RELATED APPLICATIONS

This application is the U.S. national phase application of PCT International Application No. PCT/EP2008/059362, filed Jul. 17, 2008, which claims priority to German Patent Application No. 10 2007 036 426.3, filed Aug. 2, 2007, the contents of such applications being incorporated by reference herein.

BACKGROUND OF THE INVENTION

1. Field of the Invention

A brake system of the brake-by-wire type for a motor vehicle having a brake pressure signal generator which can be activated by means of a brake pedal and can be connected to wheel brakes of the vehicle outside the brake-by-wire operating mode, having a pressure source which can be actuated by means of an electronic control unit and can be connected to the wheel brakes of the vehicle in the brake-by-wire operating mode, and having means for sensing a driver's deceleration request, and having a pedal travel simulator which interacts with the brake pedal, is formed by at least one spring element and a damping element and by means of which a restoring force acting on the brake pedal can be simulated in the brake-by-wire operating mode independently of the actuating of the pressure source, and having an electrohydraulic device which can be actuated by means of the electronic control unit and which permits activation of the pedal travel simulator in the brake-by-wire operating mode and at least partial deactivation of the pedal travel simulator outside the brake-by-wire operating mode.

2. Description of the Related Art

Such a brake system is known from DE 10 2004 011 622 A1, which is incorporated by reference, and is described in particular in conjunction with FIG. 15 in said document. In the previously known brake system, the pedal travel simulator is accommodated by a housing into which a force-transmitting element which is connected in a rotationally fixed fashion to the brake pedal projects. The housing of the pedal travel simulator is supported here, by means of a lever arm which is fixedly connected to the housing, on an electrohydraulic device which permits the pedal travel simulator to be activated and deactivated, and is formed by a cylinder-piston arrangement. In this arrangement, it is necessary to provide a bearing for the housing of the pedal travel simulator.

SUMMARY OF THE INVENTION

An object of the present invention is therefore to propose a simpler pedal travel simulator.

There is provision here that the damping element is either arranged in a positionally fixed fashion and interacts with the electrohydraulic device which is connected to the brake pedal, or is connected to the brake pedal and interacts with the electrohydraulic device which is arranged in a positionally fixed fashion. This measure ensures that there is no need for a housing for the pedal travel simulator and therefore also no need for a bearing for the housing, which provides a cost advantage.

There is provision here that when there is a positionally fixed arrangement, the damping element is assigned to a pedal block, while the electrohydraulic device is arranged so as to be capable of pivoting together with the brake pedal.

In one advantageous development, a folding bellows is provided which engages around the damping element and protects it against soiling.

When the electrohydraulic device is arranged in a positionally fixed fashion, it is assigned to a pedal block, while the damping element is arranged so as to be capable of pivoting together with the brake pedal.

There is provision here that the distance between the damping element and the electrohydraulic device can be adjusted by means of an adjustment screw. The adjustment screw is received by a thread which is arranged on the brake pedal.

In one particularly advantageous embodiment of the subject matter of the invention, the damping element has a progressive force/travel characteristic.

The electrohydraulic device is formed by a cylinder-piston arrangement which can be shut off by means of an electromagnetically activated check valve and whose piston is connected in a force-transmitting fashion to the damping element.

In this context, one development of the subject matter of the invention provides that the piston bounds a hydraulic pressure space which is connected to a low-pressure chamber with intermediate connection of the check valve. In this context, the check valve is embodied as a valve which is open in the currentless state.

A further advantageous embodiment of the brake system according to aspects of the invention provides that the pedal travel simulator has a simulator spring which is embodied as a torsion spring and which is supported on the brake pedal at one end and on the pedal block at the other. In one development, the pedal travel simulator has a further simulator spring which is embodied as a tension spring.

In one particularly development, an adjustable pedal stop is provided which determines the value of the distance between the brake pedal and the pressure source.

The pressure source is formed by a brake booster which can be activated either by means of the brake pedal or in accordance with the driver's request by means of the electronic control unit, and a master brake cylinder which is connected downstream of the brake booster.

BRIEF DESCRIPTION OF THE DRAWINGS

The invention is best understood from the following detailed description when read in connection with the accompanying drawings. Included in the drawings is the following Figures.

DETAILED DESCRIPTION OF THE PREFERRED EMBODIMENTS

Figure 1:
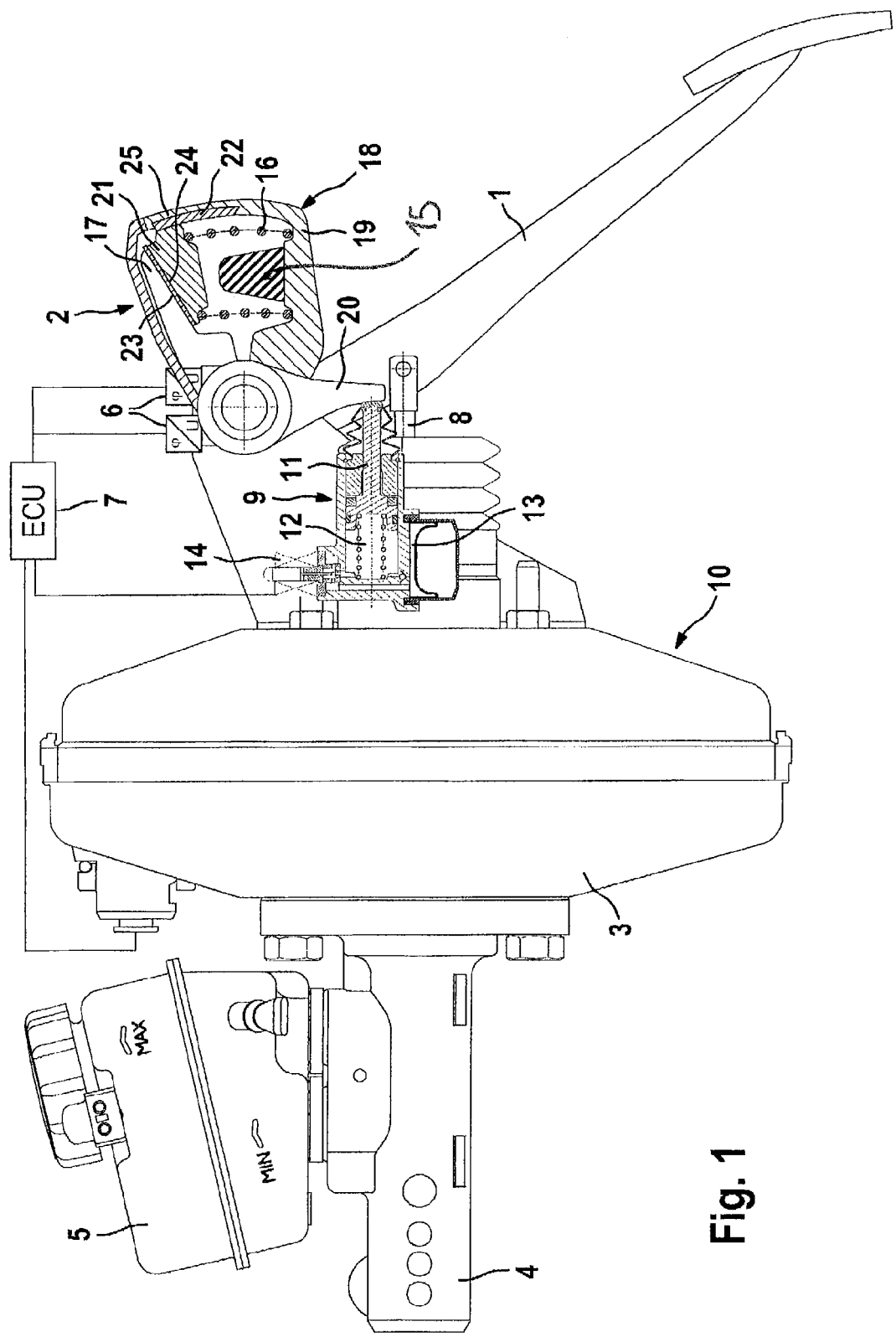
FIG. 1 is a sectional illustration of the brake system of the generic type specified at the beginning, which is known from the prior art.

The brake system (illustrated in FIG. 1) of a motor vehicle of the brake-by-wire type is known from the prior art and is composed essentially of a brake activation unit 10, a brake pedal 1, a pedal travel simulator 2, an electronic control unit 7 (illustrated only schematically) and wheel brakes (not shown) which are connected to the brake activation unit 10 with, if appropriate intermediate connection of a hydraulic open-loop or closed-loop control unit. The brake activation unit 10 is formed by a brake booster, preferably an underpressure brake booster 3, a master brake cylinder, preferably a tandem master cylinder 4, which is connected downstream of the brake booster 3 and to whose pressure spaces (not illustrated) the above-mentioned wheel brakes of the motor vehicle are connected, and by a pressure medium reservoir vessel 5 which is assigned to the master brake cylinder 4. The brake pedal 1, which the driver uses to activate the brake booster 3, interacts, in particular in the brake-by-wire operating mode, with the pedal travel simulator 2 which conveys the customary brake pedal sensation to the driver. A sensor device 6, which is preferably of redundant design, for sensing a driver's deceleration request generates, as a function of the activation of the brake pedal 1, control signals which are fed to the electronic control unit 7, by whose output signals it is possible to actuate, inter alia, an electromagnet (not illustrated) which is assigned to the brake booster 3 and which permits a pneumatic control valve, which controls the supply of air to the brake booster 3, to be activated independently of the driver's will. An axial gap, which is provided between the end of a piston rod 8 which is coupled to the brake pedal 1, and a control piston of the above-mentioned control valve ensures, in the brake-by-wire operating mode, release of the force-transmitting connection between the brake pedal 1 and the brake booster 3.

The pedal travel simulator 2 by means of which, as already mentioned, a restoring force acting on the brake pedal can be simulated in the brake-by-wire operating mode independently of activation of the brake booster 3, is embodied in such a way that in the brake-by-wire operating mode it can be activated when the force-transmitting connection between the brake pedal 1 and the brake booster 3 is released, and can be deactivated outside the brake-by-wire operating mode. The activation and the deactivation of the pedal travel simulator 2 is carried out by means of an electrohydraulic device 9 which is formed essentially by a hydraulic cylinder-piston arrangement 11, 12 which can be shut off by means of an electromagnetically activated check valve 14. The cylinder piston arrangement 11, 12 has a hydraulic pressure space 12 which is bounded by a piston 11, and a hydraulic low-pressure chamber 13 which is connected to the pressure space 12, wherein the check valve 14 permits the shutting off or the opening of the connection. The check valve 14, which can be activated or switched over by means of the actuation signals of the electronic control unit 7, is embodied as an electromagnetically activated 2/2 way valve which is open in the currentless state. A nonreturn valve, which opens toward the pressure space 12 and is not illustrated in FIG. 1, serves to perform pressure equalization between the pressure space 12 and the low-pressure chamber 13.

In the arrangement which is previously known from the prior art, the pedal travel simulator has a compression spring 16 which is clamped in between the brake pedal 1, or a force-transmitting part 17 which is connected in a rotationally fixed fashion to the brake pedal 1, and a two-armed lever 18. The two-armed lever 18 is mounted coaxially with respect to the brake pedal 1 and in such a way that it can rotate in a limited fashion while being offset in relation to the latter, wherein its first arm 19 forms a support face for the compression spring 16, while its second arm 20 is supported on the hydraulic piston 11 of the piston-cylinder arrangement 9.

In the previously known arrangement, a friction element 21 bears on the above-mentioned force-transmitting part 17 under the action of the simulator spring 16. The friction element 21 interacts with a friction face 22. The friction element 21 bears on the force-transmitting part 17 by means of obliquely arranged bearing faces 23, 24 in such a way that when the pedal travel simulator 2 is activated a force component is produced which presses the friction element 21 against the friction face 22. The abovementioned elements 16, 17, 21, 22 are preferably arranged in a housing 25 which is preferably embodied in one piece with the first arm 19 of the two-armed lever 18.

The method of functioning of the brake system described above is known to a person skilled in the art who is active in the technical field of brake-by-wire systems. In the position of rest of the brake system which is illustrated in FIG. 1 and also corresponds to the fallback level, the hydraulic pressure space 12 of the electrohydraulic device 9 is connected to the low-pressure chamber 13 via the check valve 14 which is open in the currentless state. When the brake pedal 1 is activated, its movement is sensed by the sensor device 6 and signaled to the electronic control unit 7, which simultaneously generates control signals for actuating the above-mentioned electromagnet and the check valve 14, with the result that the connection between the pressure space 12 and the low-pressure chamber 13 is broken, as a result of which the pedal travel simulator 2 is activated.

If the vehicle electronics fail or if there is a failure of the on-board power system, the check valve 14 cannot be switched over, with the result that the braking operation takes place in the fallback level. When the brake pedal 1 is activated, the two-armed lever 18 rotates along with the brake pedal 1 under the action of the simulator spring 16, with the result that the piston 11 of the electrohydraulic device 9 is shifted to the left in the drawing, and the pressure medium is displaced from the pressure space 12 into the low-pressure chamber 13. The simulator 2 is deactivated.

In order to illustrate a relatively simple pedal travel simulator 2 in which it is possible to dispense with the housing 25, the invention provides that either the electrohydraulic device 9 is connected to the brake pedal 1 in order to activate and deactivate the simulator effect and is arranged so as to be capable of pivoting together with the latter, while the damping element 15 is provided in a positionally fixed fashion on a pedal block 26, or that the damping element 15 is arranged on the brake pedal 1, while the electrohydraulic device 9 is provided in a positionally fixed fashion on the pedal block 26. The first-mentioned embodiment is illustrated in FIG. 2, and the alternative embodiment is illustrated in FIG. 3.

Figure 2:
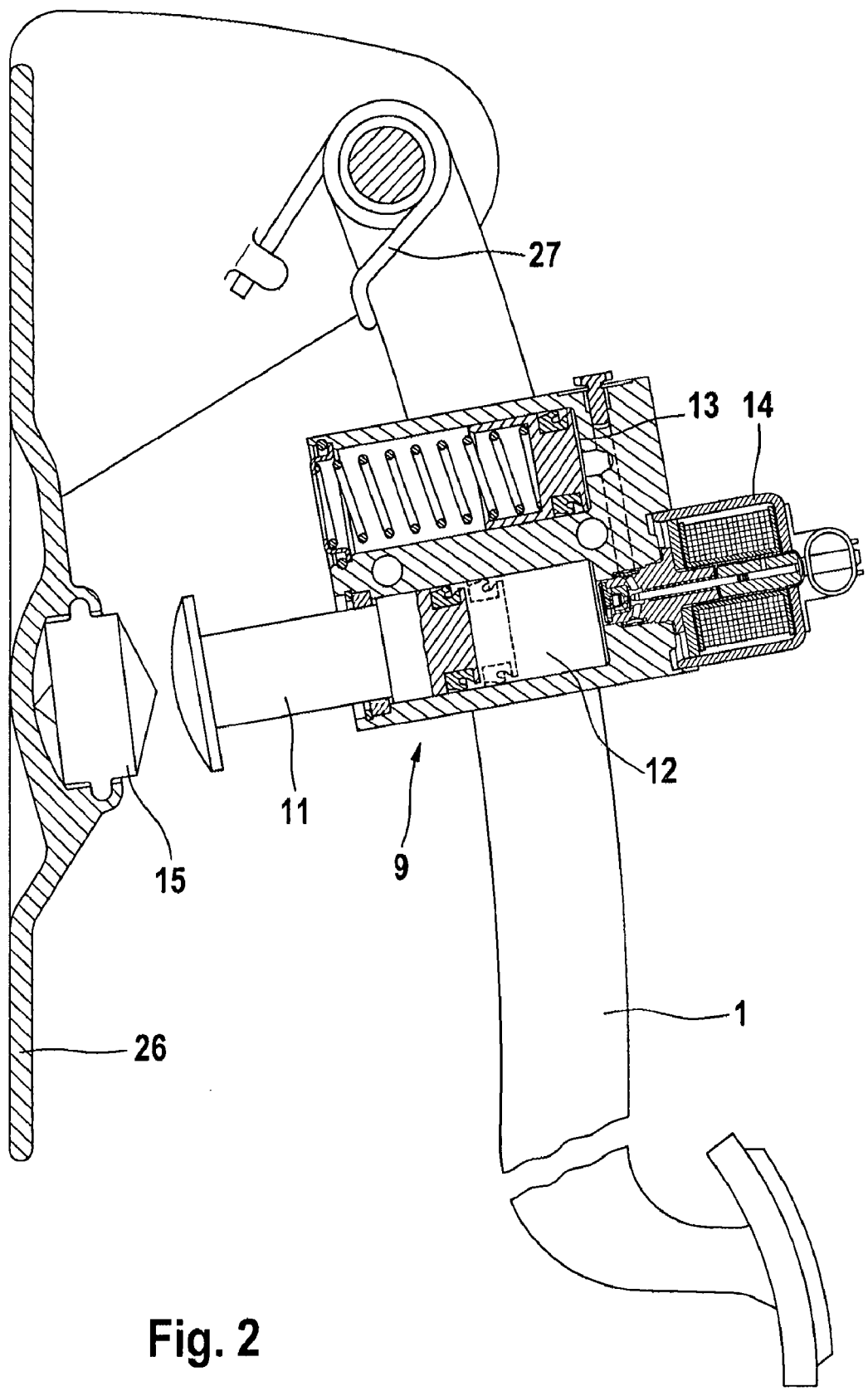
FIG. 2 is a simplified schematic illustration of the inventive arrangement of the electrohydraulic device of the brake system according to FIG. 1 and of the damping element.

In the arrangement illustrated in FIG. 2, the damping element 15 is therefore arranged in a positionally fixed fashion on a pedal block 26. A folding bellows (not illustrated) is folded over the damping element 15 in order to protect it against soiling. The electrohydraulic device 9 is connected to the brake pedal 1 and undergoes its pivoting movements along with it. When the brake pedal 1 is activated, the piston 11 is supported on the damping element 15, and in the brake-by-wire mode the check valve 14 which is open in the currentless state is closed, with the result that the piston 11 is pressed against the damping element 15. The damping element 15 has a progressive force/travel characteristic. In the fallback level, the check valve 14 remains open, and when the brake pedal 1 is activated the pressure medium can pass from the cylinder 12 into the low-pressure accumulator 13 as soon as the piston 11 comes to bear against the damping element 15. In the fallback level, activation force of the vehicle driver is therefore not absorbed by the damping element 15.

As can also be inferred from FIG. 2, part of the simulator effect is provided by the simulator spring 27 which is embodied as a torsion spring 27 and is supported on the brake pedal 1 at one end and on the pedal block 26 at the other. The action of the spring 27 cannot be deactivated in the fallback level either.

Figure 3:
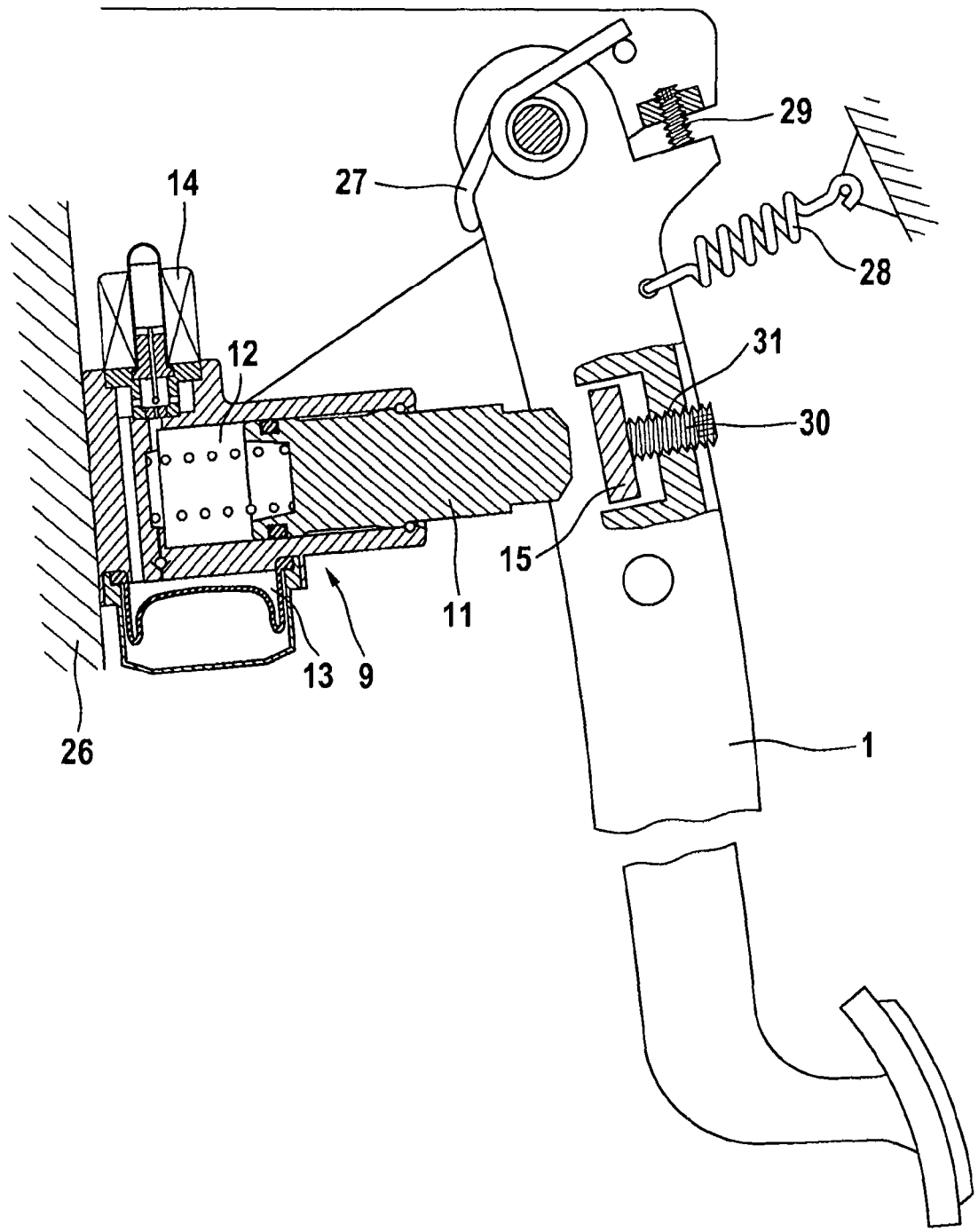
FIG. 3 shows a second embodiment of the arrangement according to aspects of the invention.

FIG. 3 illustrates an alternative embodiment to the embodiment illustrated in FIG. 2. The electrohydraulic device 9 is provided in a positionally fixed fashion on the pedal block 26, while the damping element 15 is arranged on the brake pedal 1 and undergoes the pivoting movements of the brake pedal 1 together with it. The distance between the damping element 15 and the piston 11 of the electrohydraulic device can be adjusted here using an adjustment screw 30 which interacts with a thread 31 which is arranged on the brake pedal. When the brake pedal 1 is activated, the damping element 15 comes to bear against the piston 11. In addition to the damping element 15 and the torsion spring 27, a tension spring 28 is provided which additionally serves to simulate the pedal travel. The tension spring 28 is, on the one hand, engaged in a bore on the brake pedal and, on the other hand, connected to the pedal block 26 or to the body work of the vehicle.

Furthermore, FIG. 3 illustrates a pedal stop 29 which can be adjusted by means of a screw and which determines the value of the distance between the brake pedal 1 and the brake booster 3.

Both embodiments illustrated in FIGS. 2 and 3 are advantageous in view of simplified mounting and associated reduction in costs by virtue of the simple design of the pedal travel simulator 2.

The invention claimed is:

1. A brake system of the brake-by-wire type for a motor vehicle comprising:
   a) a brake activation unit which can be activated by a brake pedal and can be connected to wheel brakes of the vehicle outside a brake-by-wire operating mode,
   b) a pressure source which can be actuated by an electronic control unit and can be connected to the wheel brakes of the vehicle in the brake-by-wire operating mode,
   c) means for sensing a driver's deceleration request,
   d) a pedal travel simulator which interacts with the brake pedal that is formed by at least one spring element and a damping element, and, by means of which, a restoring force acting on the brake pedal can be simulated in the brake-by-wire operating mode independently of actuation of the pressure source, and
   e) an electrohydraulic device which can be actuated by the electronic control unit, the electrohydraulic device comprising a check valve, the electrohydraulic device operable to activate the pedal travel simulator in the brake-by-wire operating mode and to at least partially deactivate the pedal travel simulator outside the brake-by-wire operating mode using the check valve,
   wherein the damping element is fixedly mounted to the pedal block and interacts with the electrohydraulic device which is fixedly mounted to and capable of pivoting together with the brake pedal.

2. The brake system as claimed in claim 1, wherein the electrohydraulic device is formed by a cylinder-piston arrangement which can be shut off by an electromagnetically activated check valve and whose piston is connected in a force-transmitting fashion to the damping element.

3. The brake system as claimed in claim 2, wherein the piston bounds a hydraulic pressure space which is connected to a low-pressure chamber with intermediate connection of the check valve.

4. The brake system as claimed in claim 2, wherein the check valve is embodied as a valve which is open in a currentless state.

5. The brake system as claimed in claim 1, wherein the pedal travel simulator has a simulator spring which is embodied as a torsion spring and which is supported on the brake pedal at one end and on the pedal block at the other.

6. The brake system as claimed in claim 5, wherein the pedal travel simulator has a further simulator spring which is embodied as a tension spring.

7. The brake system as claimed in claim 1, wherein a folding bellows is provided which engages around the damping element and protects the damping element against soiling.

8. The brake system as claimed in claim 1, wherein the damping element has a progressive force/travel characteristic.

9. The brake system as claimed in claim 1, wherein an adjustable pedal stop is provided which determines a value of a distance between the brake pedal and the pressure source.

10. The brake system as claimed in claim 1, wherein the pressure source is formed by a brake booster which can be activated either by the brake pedal or in accordance with a driver's request by the electronic control unit, and a master brake cylinder which is connected downstream of the brake booster.

11. A brake system of the brake-by-wire type for a motor vehicle comprising:
   a) a brake activation unit which can be activated by a brake pedal and can be connected to wheel brakes of the vehicle outside a brake-by-wire operating mode,
   b) a pressure source which can be actuated by an electronic control unit and can be connected to the wheel brakes of the vehicle in the brake-by-wire operating mode,
   c) means for sensing a driver's deceleration request,
   d) a pedal travel simulator which interacts with the brake pedal that is formed by at least one spring element and a damping element, and, by means of which, a restoring force acting on the brake pedal can be simulated in the brake-by-wire operating mode independently of actuation of the pressure source, and
   e) an electrohydraulic device which can be actuated by the electronic control unit, the electrohydraulic device comprising a check valve, the electrohydraulic device operable to activate the pedal travel simulator in the brake-by-wire operating mode and to at least partially deactivate the pedal travel simulator outside the brake-by-wire operating mode using the check valve,
   wherein the damping element is fixedly and directly mounted to an arm of the brake pedal and interacts with the electrohydraulic device which is fixedly mounted to the pedal block, and
   wherein a distance between the damping element and the electrohydraulic device is adjustable using an adjustment screw.

12. The brake system as claimed in claim 11, wherein the adjustment screw is received by a thread which is arranged on the brake pedal.

* * * * *